United States Patent
Howland et al.

[15] 3,694,930
[45] Oct. 3, 1972

[54] INSTRUMENT DRIVE SIGNALS

[72] Inventors: Robert W. Howland, Windsor; George E. Minnich, Vestal; Richard L. Van Fleet, Binghamton, all of N.Y.

[73] Assignee: The Singer Company, New York, N.Y.

[22] Filed: March 27, 1970

[21] Appl. No.: 23,378

[52] U.S. Cl. ............... 35/12 F, 35/10.2, 35/12 N, 235/150.2, 340/347.H
[51] Int. Cl. ............... G09b 9/08, B64g 7/00
[58] Field of Search ........... 35/12 N, 12 F, 10.2, 10.4; 340/347 SH; 235/150.2

[56] References Cited

UNITED STATES PATENTS

| | | |
|---|---|---|
| 3,341,697 | 9/1967 | Kaufman et al. ......... 35/10.2 X |
| 3,233,342 | 2/1966 | Bridges et al. .......... 235/150.2 |
| 3,299,197 | 1/1957 | Cutler ................. 35/10.2 |
| 3,448,201 | 6/1969 | Hannon, Jr. ............ 35/10.4 |
| 3,520,994 | 7/1970 | McAfee et al. ......... 35/10.2 X |

*Primary Examiner*—Robert W. Michell
*Assistant Examiner*—L. R. Oremland
*Attorney*—Francis L. Masselle, William Grobman and Charles S. McGuire

[57] ABSTRACT

A system providing electrical signals for controlling simulated instruments in fixed-base aircraft trainers. The signals are derived by digital integration of inputs from the flight computer representing variable flight conditions. These are compared with signals from a master logic section and a sample pulse is generated when the signals match. A pair of sample/hold circuits, in response to the sample pulse, respectively sample the instantaneous phase of sine and cosine waves which are represented as DC signals supplied to the two coils of a DC synchro repeater which positions the needle of the simulated instrument.

4 Claims, 3 Drawing Figures

INSTRUMENT DRIVE SIGNALS

This invention relates to simulation of flight instruments in a fixed-base aircraft trainer and, more specifically, to improved means for generating electrical signals for driving instruments indicating flight quantities requiring integration of a value from the simulator flight computer commensurate with the rate of change of such quantity.

In order to duplicate as closely as possible the appearance and operation of actual aircraft instruments in a fixed-base flight trainer, computing means are commonly provided to derive electrical signals commensurate with certain flight variables. The flight computer, many examples of which are presently in commercial use, is appropriately programmed and receives necessary inputs from the student controls to compute the rate of change of such variables as heading, pitch, roll and location in terms of X and Y reference coordinates.

According to the present invention the rate-of-change values from the flight computer are digitally integrated and the resulting value compared with the count from a free-running, digital master logic counter. When the integrated value matches the counter value, a sample pulse is generated to cause the instantaneous value of a continuously variable analog quantity, also controlled by the master logic, to be sampled as a DC voltage. Simultaneously sampled values of such analog quantities in the form of reference sine and cosine waves are respectively applied to the two stator windings of a DC synchro repeater. The movable needle, or other output member of the simulated instrument, is connected to the rotor of the synchro. An additional novel feature is the provision of means for using the same master logic counter to generate an analog quantity in the nature of a ramp voltage which may be sampled at selected times to provide DC electrical signals for purposes other than instrument drives.

A principal object of the invention is to provide novel and improved means for generating and controlling electrical signals used to drive simulated instruments indicating certain flight quantities in a fixed-base aircraft trainer.

A further object is to provide digital means for controlling DC voltages used to drive simulated aircraft instruments.

Another object is to provide simulated aircraft instruments driven by digitally controlled DC synchro repeaters.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
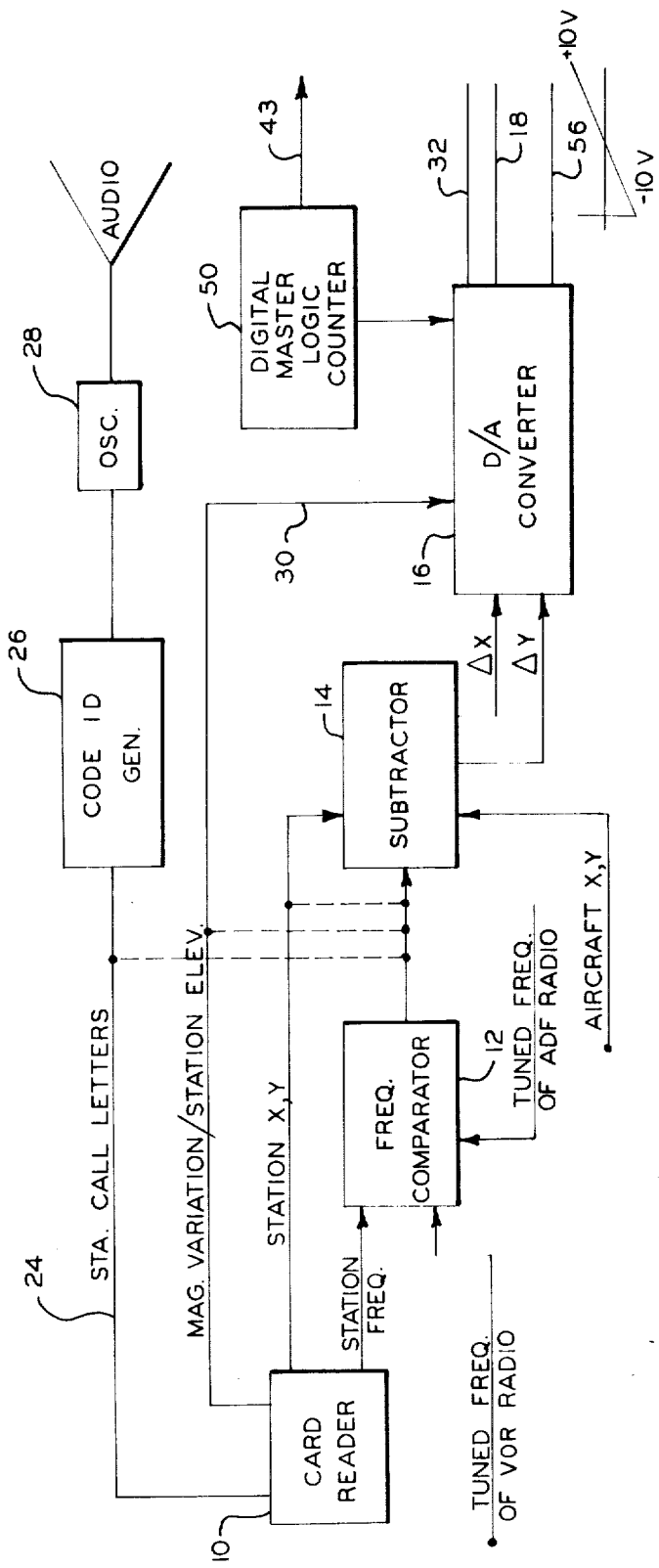
FIG. 1 is a functional block diagram of the elements providing digital signal generation and operations for simulation of radio aids and instrument drives.

One of the most common aircraft radio navigation aids is the Visual Omnirange system which includes fixed transmitters located at selected points throughout the country to generate signals for reception by aircraft radio receivers. A VOR converter drives the meter movement of an instrument which indicates to the pilot the present heading from the aircraft to or from the station transmitting the signals. In a fixed-base aircraft trainer, of course, there are no radio receivers in the proper sense, but means are provided for generating electrical signals to drive a VOR instrument in accordance with the simulated position of the aircraft and an assumed position of a VOR transmitter. The same applies with respect to other simulated navigational instruments such as glide slope, marker beacon, radio magnetic indicator (RMI), automatic direction finder (ADF), etc.

According to the present invention, station information with respect to the assumed VOR transmitters, e.g., call letters, magnetic variation, location in terms of X and Y reference coordinates, and frequency, is programmed on punched cards in accordance with well-known techniques. Similar information with respect to instrument landing system (ILS) transmitters, e.g., field elevation, distance to runway, etc., is also programmed on the cards, one line for each station simulated. By means of a student selector switch the system may be operated in either VOR or ILS mode. Suitable examples of commercially available components represented in the block diagrams are given, where appropriate, to avoid unnecessary length of the specification. Cards are inserted in static card reader 10, (e.g., Model 2980A manufactured by AMP, Inc. of Harrisburg, Pa.) where the programmed data is read and held in the reader until needed. The data is preferably shifted serially out of the card reader, thus allowing the use of common elements of electronic equipment for performing various functions to be described. The reader is interrogated to compare the programmed information with variable data from the flight computer or student inputs.

The programmed VOR station frequency is compared with the digitally represented frequency to which the simulated aircraft VOR receiver has been set by frequency comparator 12 (e.g., National Semiconductor Corp., Santa Clara, Calif., DM 8200 Comparator). The station reference coordinates X and Y are supplied to binary subtractor 14, constructed according to known techniques for standard logic components, as are the present coordinates representing the simulated position of the aircraft as computed in the standard flight computer in accordance with a preset initial (takeoff) aircraft position and flight variables such as airspeed, heading, wind drift, etc. Subtractor 14 provides digital signals, representing the difference ($\Delta X$, $\Delta Y$) between the station and aircraft coordinates, to D/A converter 16 (e.g., Model EDAC-10 of Data Device Corp., Hicksville, N. Y.) which converts the signals to analog DC voltage outputs on line 18.

Figure 3:
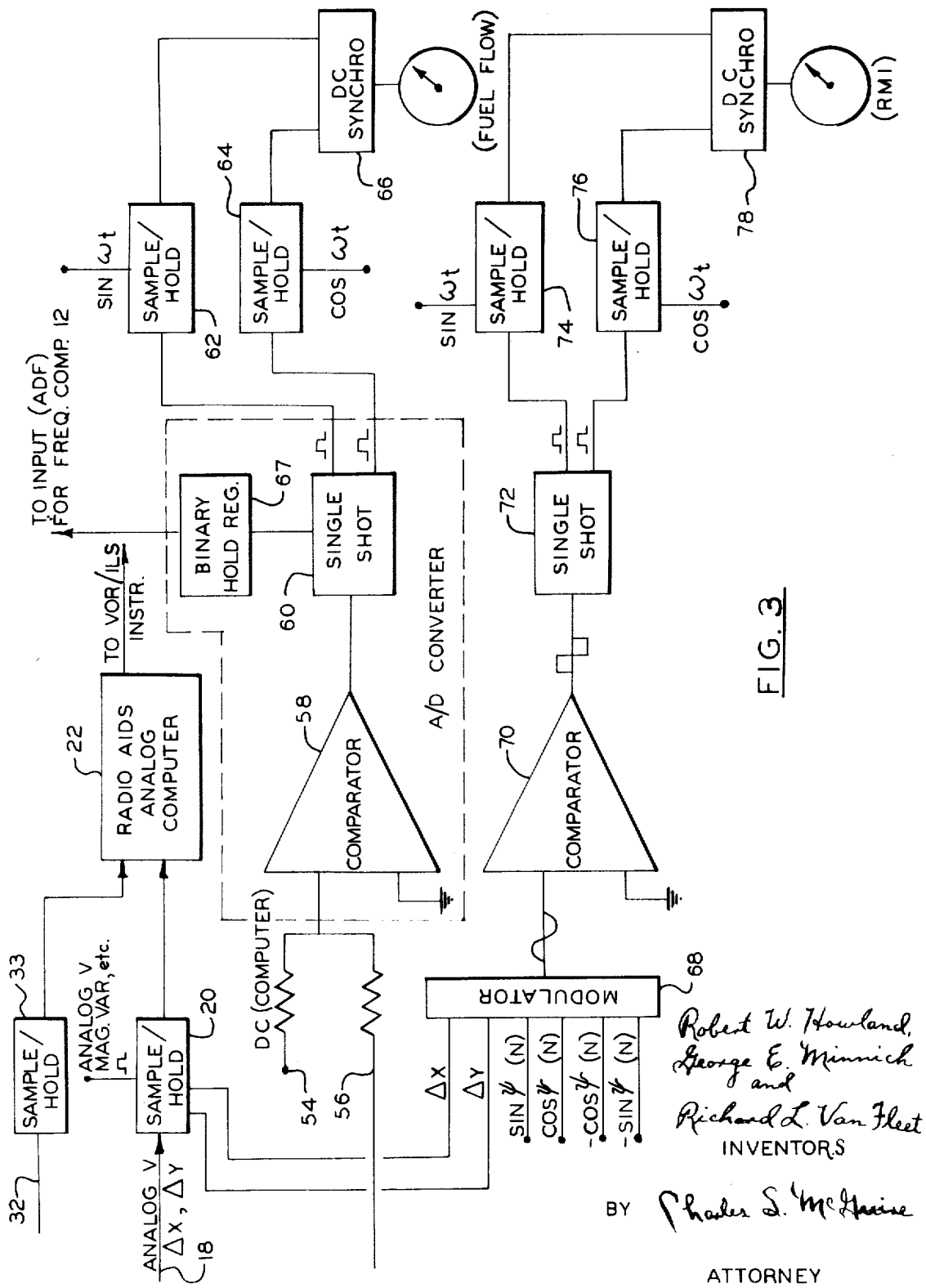
FIG. 3 is an additional functional block diagram of elements for digitally integrating signals representing variable flight quantities and providing DC outputs for driving flight instruments.

Turning briefly to FIG. 3 sample/hold circuit 20 is shown receiving the $\Delta X$, $\Delta Y$ analog inputs from line 18 and sample pulses through line 21 from frequency comparator 12 when the output of the latter indicates that the aircraft radio is properly tuned to the station frequency. When a sampling pulse is received, the instantaneous value of the analog voltage commensurate with $\Delta X$ and $\Delta Y$ is sampled and applied to radio aids analog computer 22, conventional in many aircraft trainers in present commercial use, for computation of signals to drive an appropriate simulated VOR instrument.

Returning to FIG. 1, another value from card reader 10 indicating the station call letters is fed through line 24 to code ID generator, a suitable example of which, insofar as the internal code generation is concerned, is disclosed in U. S. application Ser. No. 633,296; appropriate modification is provided to allow the present code generator to accept the binary input from the reader. Generator 26 supplies serial binary signals which are fed directly to oscillator 28 to provide an audio output of the call letters in Morse code. Signals from reader 10 indicating magnetic variation and station elevation (when operating in VOR mode), or runway bearing and field elevation (when operating in ILS mode), are fed through line 30 to D/A converter 16. The latter is multiplexed to provide, in addition to the previously mentioned output on line 18 and others described later, an analog voltage through line 32 commensurate with the digital input through line 30. This analog value is sampled by sample/hold circuit 33 (FIG. 3) and applied to computer 22 in the same manner as the analog value on line 18 representing $\Delta X$ and $\Delta Y$. All of the values representing station data are controlled by frequency comparator 12 since the data is valid only when the simulated radio is set by the student to the proper frequency.

Signals representing the rate of change of certain flight variables, as determined by the flight computer, must be integrated to provide values of the quantities which may be used to drive certain flight instruments, and for other purposes. For example, the flight computer may generate signals representing the rate of change of heading which must be integrated to provide signals for driving the simulated gyro compass instrument; pitch and roll rate of change provide signals for the aircraft attitude instruments, as well as providing position signals for the trainer motion system; aircraft X and Y rate of change may be integrated to provide signals to a recorder which plots the simulated path followed by the aircraft. In the system of the present invention, signals representing heading, pitch, roll, X and Y are derived by digital integration, thereby eliminating cumulative errors (drift) inherent in analog systems.

Figure 2:
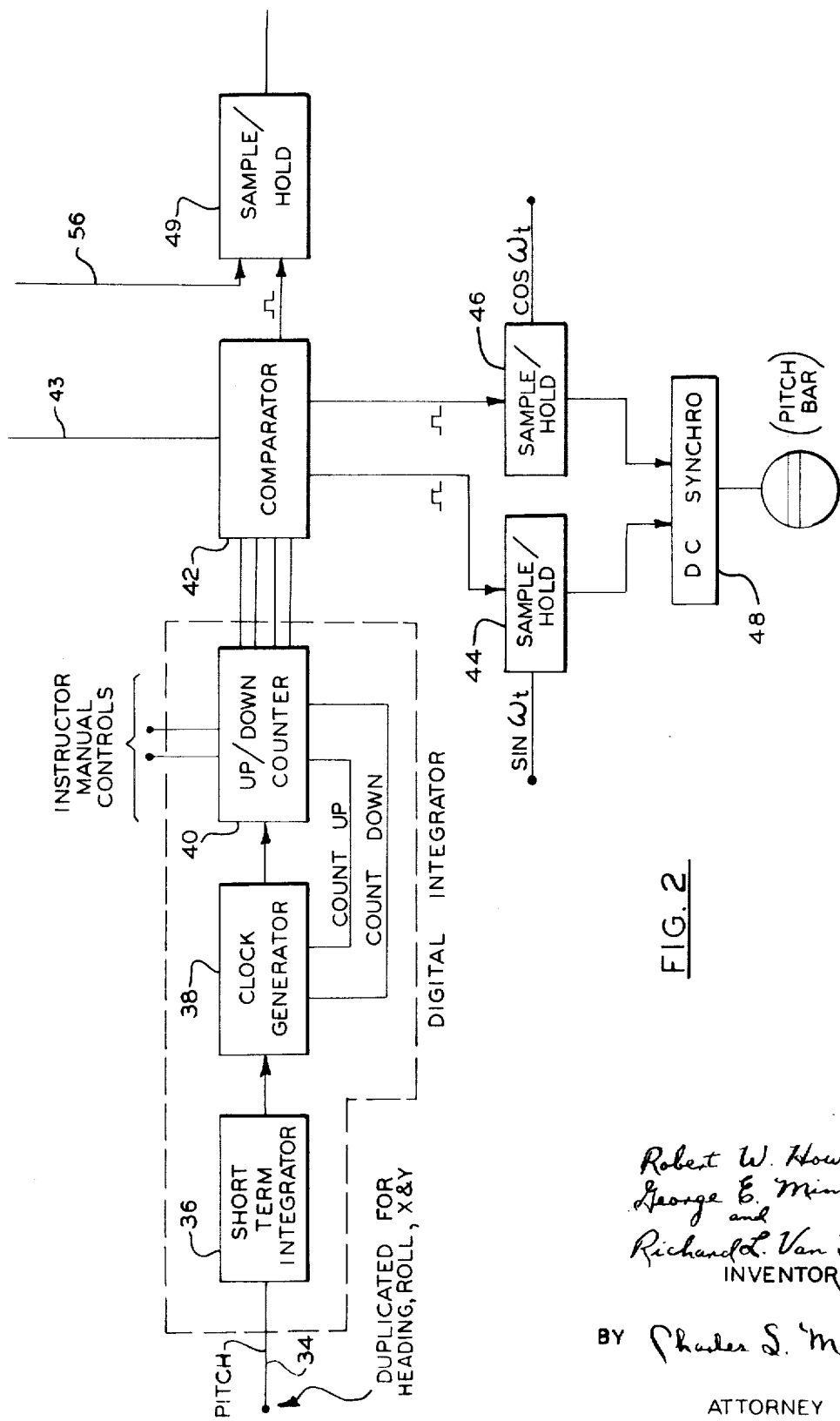
FIG. 2 is a functional block diagram of other elements which receive analog inputs converted from the digital signals of FIG. 1, and provide outputs for the simulated navigational and flight instruments.

FIG. 2 shows in block diagram form the elements for deriving signals to drive the simulated pitch bar or artificial horizon instrument and a DC signal commensurate with pitch attitude. The elements of FIG. 2 would be duplicated for each of the other flight variables to be integrated. The signal from the flight computer representing rate of change of pitch is provided through line 34 to short term integrator 36 (e.g., National Semiconductor LM 201 Operational Amplifier). This integrated value is applied to clock generator 38 (e.g., Fairchild Semiconductor, Mountain View, Calif., Model 9601 Single Shot Multivibrator) to control the frequency of pulses applied to up-down counter 40 (e.g., National Semiconductor DM 8563 16-pin flat pack). The initial condition of the counter may be controlled by the manual setting of potentiometers having analog outputs representing the initial aircraft reference position (X, Y) which are applied to an A/D converter (not shown) and then applied digitally to counter 40. The rate of the counter is determined by the frequency of pulses from clock generator 38 and the direction of the count, up or down, is dependent on the polarity of the input from the computer. The counter value is compared by digital comparator 42 (e.g., National Semiconductor DM 8200 Comparator) with an input from a free-running digital master logic counter supplied through line 43. When the two values match, an output pulse is generated by the comparator and applied as a sample pulse to sample/hold circuits 44 and 46. The amplitude of a 400 Hz sine wave, referenced to the master logic of the trainer and applied continuously from the computer to circuit 44, is sampled at the time a pulse is received from comparator 42; this will cause the amplitude to be sampled at the phase angle of the sine wave corresponding to the pitch angle. A DC signal commensurate with the amplitude of the sine wave at that time is applied to one winding of DC synchro 48. Likewise, the amplitude of a reference cosine wave is sampled at the proper phase angle by circuit 46 in response to a pulse from comparator 42 and applied as a DC input to the other winding of synchro 48. Thus, the simulated pitch bar driven by the DC synchro will be positioned in accordance with simulated aircraft pitch attitude. The function and operation of sample/hold 49 will be explained later.

The output of free-running, digital counter 50, controlled by the flight computer master logic, is applied to D/A converter 16 which is time shared so that, in addition to the analog DC voltages previously described, the output of counter 50 is converted to a ramp voltage, e.g., from $-10$ to $+10$ volts at a rate of 400 cycles per second. The ramp voltage may be compared with another analog quantity, and when the two match, a sample pulse generated to provide signals to drive instruments where no integration of the flight quantity input is required. Such instruments include, for example, rate of climb, rpm, fuel pressure, fuel flow and manifold air pressure. A DC signal from the flight computer commensurate with the computed value of the appropriate flight quantity is applied at terminal 54. When this value is equal to the value of the ramp voltage applied to line 56 the polarity of amplifier 58, which thus serves as a comparator of the voltages on lines 54 and 56, is changed. This fires single shot multivibrator 60 to provide sampling pulses to sample/hold circuits 62 and 64. The amplitudes of sine and cosine waves applied by the computer to circuits 62 and 64, respectively, are thus sampled and applied as DC signals to the windings of synchro 66. The latter comprises a DC synchro repeater having two orthogonal stator windings and a permanent magnet rotor. By energizing the two windings with DC voltages proportional to the sine and cosine of an angle $\omega t$ the rotor will orient itself with the resultant field at an angle relative to an initial reference position which indicates the simulated value of the flight quantity.

Another input which may be applied at a terminal such as 54 for comparison with the ramp voltage on line 56 is an analog voltage commensurate with the position at which the tuning dial of the simulated ADF radio is set by the student operator of the flight trainer. Although VOR receivers are tuned to discrete frequencies and thus may be digitally represented, ADF tuning is analog in nature and must be converted to digital form before being used in the system of FIG. 1. 0When multivibrator 60 fires in response to change of polarity of amplifier 58, the binary number necessary to produce the analog value of the ramp voltage at that time is entered in binary hold register 67. This value is supplied to frequency comparator 12 for comparison with the ADF frequency programmed on the punched card in reader 10. In this instance, comparator 58, multivibrator 60 and hold register 67 form an A/D converter, indicated by dotted lines in FIG. 3, for converting the data into digital form. Of course, a separate comparator and multivibrator would be provided for each analog input at terminals such as 54, but for ease of illustration only one set of elements is shown for both inputs discussed above.

The value of the ramp voltage is sampled by circuit 49 when a sampling pulse is generated by comparator 42. The sample pulse is generated, as previously mentioned, when a digital value representing some flight quantity matches a corresponding input from the master logic. In the FIG. 2 example, a pulse from comparator 42 is generated in response to a pulse count from counter 40 representing aircraft pitch matching a corresponding value from the master logic counter 50. A sampling of the ramp voltage at that time indicates the binary value required to produce the sampled ramp voltage. Thus, a DC voltage output from sample/hold circuit 49 indicating aircraft pitch may be used as an input to the motion system which physically orients the trainer cockpit with the pitch angle of the simulated aircraft. Likewise, sampling of ramp voltages to produce DC outputs indicating aircraft X and Y may be used to drive a recorder.

Quantities representing $\Delta X$ and $\Delta Y$, supplied on line 18 as previously described, and the sine and cosine and negative sine and cosine of heading angle, are applied to modulator 68. The variable sine and cosine values are represented as notched square waves, as explained in Minnich et al. application Ser. No. 725,706, wherein the operation of modulators such as 68 is also discussed. The output of modulator 68 is a sine wave which is changed to a square wave at the same phase by analog comparator 70. When the phase of the wave crosses zero single shot multivibrator 72 is fired to produce a sampling pulse to circuits 74 and 76. The phase of the sine wave output of modulator 68 is commensurate with the difference between $\Delta X/\Delta Y$ and heading angle. Thus, the sampling of sine $\omega t$ and cosine $\omega t$ in accordance with the phase of this output indicates the difference between the bearing from the aircraft to the station and the heading of the aircraft. This is the information displayed by the needles of an RMI instrument driven by DC synchro 78.

We claim:

1. In a fixed-base aircraft trainer having a flight computer for generating electrical signals commensurate with the rate of change of certain variable flight quantities,
   a. digital integrating means constructed and arranged to receive said signals from said flight computer and generate a digital value commensurate with the value of said flight quantity;
   b. a free-running digital counter for generating a master logic signal;
   c. comparator means adapted to receive said digital value and said master logic signal as inputs and to generate a pulse output when said digital value corresponds to the value of said master logic input to said comparator means;
   d. a digital-to-analog converter for generating a ramp voltage in response to an input from said digital counter;
   e. means for sampling, in response to said pulse output, the instantaneous value of said ramp voltage; and
   f. means for supplying said instantaneous value in the form of a DC voltage to drive an output member of said simulated instrument.

2. The invention according to claim 1 wherein said output member is driven by a DC synchro repeater.

3. The invention according to claim 2 wherein said analog function comprises sine and cosine functions referenced to said master logic input.

4. The invention according to claim 3 wherein said instantaneous value comprises the amplitude of said sine and cosine functions, and the DC voltages representing the sampled sine and cosine amplitudes are respectively supplied to the two windings of said DC synchro.

* * * * *